E. C. STUMME.
TIME CALCULATOR.
APPLICATION FILED JAN. 2, 1920.

1,387,082.

Patented Aug. 9, 1921.

| Month | Date | No of Past Days to Jan.1 | No of Future Days from Jan.1 | Month | Date | No of Past days to Jan.1 | No of Future Days from Jan.1 | Month | Date | No of Past Days to Jan.1 | No of Future Days from Jan.1 | Month | Date | No of Past Days to Jan.1 | No of Future Days from Jan.1 | Month | Date | No of Past Days to Jan.1 | No of Future Days from Jan.1 | Month | Date | No of Past Days to Jan.1 | No of Future Days from Jan.1 |
|---|---|---|---|---|---|---|---|---|---|---|---|---|---|---|---|---|---|---|---|---|---|---|---|
| JANUARY | | | | MARCH | | | | MAY | | | | JANUARY | | | | SEPTEMBER | | | | NOVEMBER | | | |
| | .01 | 365 | 365 | | .01 | 306 | .59 | | .01 | 245 | 120 | | .01 | 184 | 181 | | .01 | 122 | 243 | | .01 | .61 | 304 |
| | .02 | 364 | .01 | | .02 | 305 | .60 | | .02 | 244 | 121 | | .02 | 183 | 182 | | .02 | 121 | 244 | | .02 | .60 | 305 |
| | .03 | 363 | .02 | | .03 | 304 | .61 | | .03 | 243 | 122 | | .03 | 182 | 183 | | .03 | 120 | 245 | | .03 | .59 | 306 |
| | .04 | 362 | .03 | | .04 | 303 | .62 | | .04 | 242 | 123 | | .04 | 181 | 184 | | .04 | 119 | 246 | | .04 | .58 | 307 |
| | .05 | 361 | .04 | | .05 | 302 | .63 | | .05 | 241 | 124 | | .05 | 180 | 185 | | .05 | 118 | 247 | | .05 | .57 | |
| | .06 | 360 | .05 | | .06 | 301 | .64 | | .06 | 240 | 125 | | .06 | 179 | 186 | | .06 | 117 | 248 | | .06 | .56 | |
| | .07 | 359 | .06 | | .07 | 300 | .65 | | .07 | 239 | 126 | | .07 | 178 | 187 | | .07 | 116 | 249 | | .07 | | |
| | .08 | 358 | .07 | | .08 | 299 | .66 | | .08 | 238 | 127 | | .08 | 177 | 188 | | .08 | 115 | 250 | | .08 | | |
| | .09 | 357 | .08 | | .09 | 298 | .67 | | .09 | 237 | 128 | | .09 | 176 | 189 | | .09 | 114 | 251 | | | | |
| | .10 | 356 | .09 | | .10 | 297 | .68 | | .10 | 236 | 129 | | .10 | 175 | 190 | | .10 | 113 | 252 | | | | |
| | .11 | 355 | .10 | | .11 | 296 | .69 | | .11 | 235 | 130 | | .11 | 174 | 191 | | .11 | 112 | 253 | | | | |
| | .12 | 354 | .11 | | .12 | 295 | .70 | | .12 | 234 | 131 | | .12 | 173 | 192 | | .12 | | | | | | |
| | .13 | 353 | .12 | | .13 | 294 | .71 | | .13 | 233 | 132 | | .13 | 172 | 193 | | .13 | | | | | | |
| | .14 | 352 | .13 | | .14 | 293 | .72 | | .14 | 232 | 133 | | .14 | 171 | 194 | | | | | | | | |
| | .15 | 351 | .14 | | .15 | 292 | .73 | | .15 | 231 | 134 | | .15 | 170 | | | | | | | | | |
| | .16 | 350 | .15 | | .16 | 291 | .74 | | .16 | 230 | 135 | | .16 | 169 | | | | | | | | | |
| | .17 | 349 | .16 | | .17 | 290 | .75 | | .17 | 229 | 136 | | | | | | | | | | | | |
| | .18 | 348 | .17 | | .18 | 289 | .76 | | .18 | | | | | | | | | | | | | | |
| | .19 | 347 | .18 | | .19 | 288 | .77 | | | | | | | | | | | | | | | | |
| | .20 | 346 | .19 | | .20 | 287 | | | | | | | | | | | | | | | | | |
| | .21 | 345 | .20 | | .21 | | | | | | | | | | | | | | | | | | |
| | .22 | 344 | .21 | | | | | | | | | | | | | | | 10 | | | | | |
| | .23 | 343 | | | | | | | | | | | | | | | | | | | | | |
| | .24 | 342 | .23 | | .24 | 283 | | | | | | | | | | | | | | | | | |
| | .25 | 341 | .24 | | .25 | 282 | .83 | | .25 | | | | | | | | | | | | | | |
| | .26 | 340 | .25 | | .26 | 281 | .84 | | .26 | 220 | 145 | | .26 | | | | | | | | | | |
| | .27 | 339 | .26 | | .27 | 280 | .85 | | .27 | 219 | 146 | | .27 | 158 | 207 | | .27 | | | | | | |
| | .28 | 338 | .27 | | .28 | 279 | .86 | | .28 | 218 | 147 | | .28 | 157 | 208 | | .28 | .95 | 270 | | | | |
| | .29 | 337 | .28 | | .29 | 278 | .87 | | .29 | 217 | 148 | | .29 | 156 | 209 | | .29 | .94 | 271 | | .29 | .53 | |
| | .30 | 336 | .29 | | .30 | 277 | .88 | | .30 | 216 | 149 | | .30 | 155 | 210 | | .30 | .93 | 272 | | .30 | .32 | 333 |
| | .31 | 335 | .30 | | .31 | 276 | .89 | | .31 | 215 | 150 | | .31 | 154 | 211 | | | | | | | | |
| FEBRUARY | .01 | 334 | .31 | APRIL | .01 | 275 | .90 | JUNE | .01 | 214 | 151 | AUGUST | .01 | 153 | 212 | OCTOBER | .01 | .92 | 273 | DECEMBER | .01 | .31 | 334 |
| | .02 | 333 | .32 | | .02 | 274 | .91 | | .02 | 213 | 152 | | .02 | 152 | 213 | | .02 | .91 | 274 | | .02 | .30 | |
| | .03 | 332 | .33 | | .03 | 273 | .92 | | .03 | 212 | 153 | | .03 | 151 | 214 | | .03 | .90 | 275 | | .03 | | |
| | .04 | 331 | .34 | | .04 | 272 | .93 | | .04 | 211 | 154 | | .04 | 150 | 215 | | .04 | .89 | 276 | | | | |
| | .05 | 330 | .35 | | .05 | 271 | .94 | | .05 | 210 | 155 | | .05 | 149 | 216 | | .05 | .88 | | | | | |
| | .06 | 329 | .36 | | .06 | 270 | .95 | | .06 | 209 | 156 | | .06 | 148 | 217 | | .06 | | | | | | |
| | .07 | 328 | .37 | | .07 | 269 | .96 | | .07 | 208 | 157 | | .07 | 147 | 218 | | | | | | | | |
| | .08 | 327 | .38 | | .08 | 268 | .97 | | .08 | 207 | 158 | | .08 | 146 | | | | | | | | | |
| | .9 | 326 | .39 | | .09 | 267 | .98 | | .09 | 206 | 159 | | .09 | 145 | | | | | | | | | |
| | .10 | 325 | .40 | | .10 | 266 | .99 | | .10 | 205 | 160 | | | | | | | | | | | | |
| | .11 | 324 | .41 | | .11 | 265 | 100 | | .11 | 204 | | | | | | | | | | | | | |
| | .12 | 323 | .42 | | .12 | 264 | 101 | | .12 | | | | | | | | | | | | | | |
| | .13 | 322 | .43 | | .13 | 263 | 102 | | | | | | | | | | | 11 | | | | | |
| | .14 | 321 | .44 | | .14 | 262 | | | | | | | | | | | | | | | | | |
| | .15 | 320 | .45 | | .15 | | | | | | | | | | | | | | | | | | |
| | .16 | 319 | .46 | | | | | | | | | | | | | | | | | | | | |
| | .17 | 318 | .47 | | .17 | | | | | | | | | | | | | | | | | | |
| | .18 | 317 | .48 | | .18 | 258 | 107 | | | | | | | | | | | | | | | | |
| | .19 | 316 | .49 | | .19 | 257 | 108 | | .19 | | | | | | | | | | | | | | |
| | .20 | 315 | .50 | | .20 | 256 | 109 | | .20 | 195 | 170 | | | | | | | | | | | | |
| | .21 | 314 | .51 | | .21 | 255 | 110 | | .21 | 194 | 171 | | .21 | 133 | 232 | | | | | | | | |
| | .22 | 313 | .52 | | .22 | 254 | 111 | | .22 | 193 | 172 | | .22 | 132 | 233 | | .22 | .71 | 294 | | | | |
| | .23 | 312 | .53 | | .23 | 253 | 112 | | .23 | 192 | 173 | | .23 | 131 | 234 | | .23 | .70 | 295 | | .23 | .09 | |
| | .24 | 311 | .54 | | .24 | 252 | 113 | | .24 | 191 | 174 | | .24 | 130 | 235 | | .24 | .69 | 296 | | .24 | .08 | 357 |
| | .25 | 310 | .55 | | .25 | 251 | 114 | | .25 | 190 | 175 | | .25 | 129 | 236 | | .25 | .68 | 297 | | | | |
| | .26 | 309 | .56 | | .26 | 250 | 115 | | .26 | 189 | 176 | | .26 | 128 | 237 | | .26 | .67 | | | | | |
| | .27 | 308 | .57 | | .27 | 249 | 116 | | .27 | 188 | 177 | | .27 | 127 | 238 | | .27 | .66 | | | | | |
| | .28 | 307 | .58 | | .28 | 248 | 117 | | .28 | 187 | 178 | | .28 | 126 | 239 | | .28 | .65 | | | | | |
| | | | | | .29 | 247 | 118 | | .29 | 186 | 179 | | .29 | 125 | 240 | | .29 | .64 | | | | | |
| | | | | | .30 | 246 | 119 | | .30 | 185 | 180 | | .30 | 124 | 241 | | .30 | .63 | | | | | |
| | | | | | | | | | | | | | .31 | 123 | 242 | | .31 | .62 | | | | | |

Inventor
Emil C Stumme
By [signature]
Attorney

UNITED STATES PATENT OFFICE.

EMIL C. STUMME, OF READLYN, IOWA.

TIME-CALCULATOR.

1,387,082.   Specification of Letters Patent.   Patented Aug. 9, 1921.

Application filed January 2, 1920. Serial No. 348,716.

*To all whom it may concern:*

Be it known that I, EMIL C. STUMME, a citizen of the United States, residing at Readlyn, in the county of Bremer, State of Iowa, have invented certain new and useful Improvements in Time-Calculators; and I do hereby declare the following to be a full, clear, and exact description of the invention, such as will enable others skilled in the art to which it appertains to make and use the same.

This invention relates to new and useful improvements in calculators and particularly to devices for calculating time.

One object of the present invention is to provide a novel and improved method of calculating the number of days which elapse between a given date and a future date.

Another object is to provide a novel and improved means whereby given a date and a number of days in the future from such date, the date on which the last day of the given number of days occurs can be quickly and accurately ascertained.

Other objects and advantages will be apparent from the following description when taken in connection with the accompanying drawing.

In the drawing:

The figure is a view of the first page of a book showing the numbers used in the calculations.

The book contains three hundred and sixty-five pages, one for each day of the year, each page being divided into an upper half 10 and a lower half 11, while the entire page is divided into vertical columns in groups of fours, the numbers 1, 2, 3, and 4 being printed at the heads of the respective columns. There are six of such column groups, and between each pair of groups is a vertical column in which is printed the name of a month, the entire twelve months of the year being thus printed on the page. It will be noted, however, that the first month, January, is in the first column of the page, in the upper section thereof, while the second month, February, is in the same vertical column, but in the lower section. Likewise, the third, fifth, etc., months are in the upper sections of the vertical columns, while the fourth, sixth, etc., months are in the lower sections of said columns.

At the top of the first page of the book, the page illustrated in the drawing, is printed January 1. On the second page is printed January 2, the remaining pages being printed with the month and day of each month and day of the year. There will thus be three hundred and sixty-five pages in the book.

In the second column of each of the groups of four columns are printed from 1 to the complete number of days in the corresponding month. For instance, in the January column the numbers in the second column run from 1 to 31, in the upper section, while in the lower section of said column, which is the February column, the numbers run from 1 to 28. In the second column of the second group, and in the upper half, the numbers run from 1 to 31, while in the lower half the numbers run from 1 to 30. Thus the numbers in the second columns correspond to the number of days in the particular month printed in the first column of that group.

In the third column of the first group the first number is 365, the second 364, and so on to the bottom of the lower half of the said column, decreasing by 1. The first number of the third column of the next group begins with a number which is the one less than that at the bottom of the third column of the first group, and so on through the third columns of the succeeding groups. These numbers represent the days of the year in numerical succession.

In the fourth columns of the different groups, running in numerical succession by increases of 1, throughout the six columns, are the forwardly progressing number names of the days from January 1 to December 31. It will be noted that the first number of the first of the fourth columns is 365, the second 1, and continued to 364 in the last of the fourth columns.

On the succeeding pages the first columns are numbered exactly as the page illustrated. The columns numbered 2 also are the same on all of the pages. Columns 3 and 4, however, change by 1, on each succeeding page. Each succeeding page has printed at the top the name of the month and the date.

On the second page the first number of the third column of the first group would be 1, the next number 365, and the following numbers decreasing by one, so that on December 31, the numbers in the third column, at the last group, and at the lower section of the page would read 364, 2.

The fourth column begins 364, 365, 1, and ends 363.

On the last page, or that at the top of which is printed December 31, the third column begins 364, 363, etc., while the fourth column begins 1, 2, 3, etc. The third and fourth columns of the December 31 page each ends with 365.

The use of the calculator is as follows:

To find the number of days a note has run which was given June 30 and paid January 1, find June 30 in the second column, in the lower section of the third group. Opposite this date, in the third column will be found 185, the number of days to be found.

To find on what date a note falls due if given on January 1 for one hundred and twenty-eight days, find 128 in the fourth column of the third group, and in the upper section, and opposite this number will be found, in the first column of that group the number 9. This group is named May, this giving the date of the falling due of the note as of May 9.

If a note is given January 1 and payable October 25, to find the number of days the note runs find October 25 and in the fourth column of this group, to the right of said date, will be found 297, the number of days the note runs.

The same procedure is followed on any of the pages of the book.

What is claimed is:

A time calculator comprising a book of pages each of which is divided into twelve month groups each consisting of a number of vertical columns, one column of each month group having forwardly progressing dates of the month, corresponding columns of the month groups having the numerical days of the year in reverse order and continued throughout all of the month groups, the remaining corresponding columns of the month groups having the numerical days of the year in forwardly progressing order and continued throughout all of the month groups, the first-named columns representing dates of the months, the second-named columns representing past numbers of days, while the third-named columns represent the future numbers of days.

In testimony whereof, I affix my signature, in the presence of two witnesses.

EMIL C. STUMME.

Witnesses:
H. G. MOELLER,
H. F. BOEVERS.